(12) United States Patent
Hershcovitch et al.

(10) Patent No.: US 7,075,030 B2
(45) Date of Patent: Jul. 11, 2006

(54) SHIELDED BEAM DELIVERY APPARATUS AND METHOD

(75) Inventors: Ady Hershcovitch, Mount Sinai, NY (US); Rory Dominick Montano, Canton, CT (US)

(73) Assignee: Brookhaven Science Associates, LLC, Upton, NY (US)

( * ) Notice: Subject to any disclaimer, the term of this patent is extended or adjusted under 35 U.S.C. 154(b) by 4 days.

(21) Appl. No.: 10/932,653

(22) Filed: Aug. 30, 2004

(65) Prior Publication Data

US 2006/0043075 A1 Mar. 2, 2006

(51) Int. Cl.
*B23K 10/00* (2006.01)

(52) U.S. Cl. .......................... 219/121.36; 219/121.48; 219/121.59; 204/298.21; 250/423 R (58) Field of Classification Search ........... 219/121.54, 219/121.57, 121.43, 121.41, 121.59, 121.48; 204/298.21; 118/723 R, 723 I; 315/111.21, 315/111.51, 111.71; 250/492.3, 423 R
See application file for complete search history.

(56) References Cited

U.S. PATENT DOCUMENTS

| | | | | |
|---|---|---|---|---|
| 3,271,556 | A | * | 9/1966 | Harris .................... 219/121.24 |
| 4,252,607 | A | * | 2/1981 | Thode ........................ 376/105 |
| 5,382,866 | A | * | 1/1995 | Boggasch et al. ..... 313/231.31 |
| 5,578,831 | A | * | 11/1996 | Hershcovitch .............. 250/398 |
| 5,705,785 | A | * | 1/1998 | Dykhno et al. ........ 219/121.45 |
| 6,476,399 | B1 | * | 11/2002 | Harrington et al. .... 250/492.21 |
| 6,528,948 | B1 | | 3/2003 | Hershcovitch et al. |

OTHER PUBLICATIONS

Hirsch et al, "Gaseous Electronics," vol. 1, Electrical Discharges, 1978, pp. cover, 29, 358-360, 395, and 396.

* cited by examiner

*Primary Examiner*—Mark Paschall
(74) *Attorney, Agent, or Firm*—Margaret C. Bogosian (57) ABSTRACT

An apparatus includes a plasma generator aligned with a beam generator for producing a plasma to shield an energized beam. An electrode is coaxially aligned with the plasma generator and followed in turn by a vortex generator coaxially aligned with the electrode. A target is spaced from the vortex generator inside a fluid environment. The electrode is electrically biased relative to the electrically grounded target for driving the plasma toward the target inside a vortex shield.

33 Claims, 6 Drawing Sheets

SHIELDED BEAM DELIVERY APPARATUS AND METHOD

This invention was made with Government support under contract number DE-AC02-98CH10886, awarded by the U.S. Department of Energy. The Government has certain rights in the invention.

BACKGROUND OF THE INVENTION

The present invention relates generally to manufacturing processes using energized beams, and, more specifically, to shielding such beams.

Many industrial manufacturing processes use an energized beam transmitted under high vacuum to prevent the degradation thereof. For example, material modification by ion implantation, dry etching, and micro-fabrication use high energy ion beams in a vacuum to protect the readily attenuated ion beams.

Electron beams are another example of high energy beams transmitted under vacuum for electron beam machining, melting, drilling, and welding. And, high energy laser beams are also used for cutting and drilling operations typically performed in atmospheric air instead of high vacuum.

It is common practice to maintain under high vacuum electron guns, ion guns, their extractors, and accelerators for efficient use thereof. For laser processes performed in atmospheric air chemical interactions with the atmospheric gases can adversely affect various laser processes.

Furthermore, none of the processes using high energy beams can presently be performed underwater due to the hostile environment thereof.

Accordingly, it is desired to provide an apparatus and method for delivering shielded beams to a target in a fluid environment.

BRIEF SUMMARY OF THE INVENTION

An apparatus includes a plasma generator aligned with a beam generator for producing a plasma to shield an energized beam. An electrode is coaxially aligned with the plasma generator and followed in turn by a vortex generator coaxially aligned with the electrode. A target is spaced from the vortex generator inside a fluid environment. The electrode is electrically biased relative to the electrically grounded target for driving the plasma toward the target inside a vortex shield.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
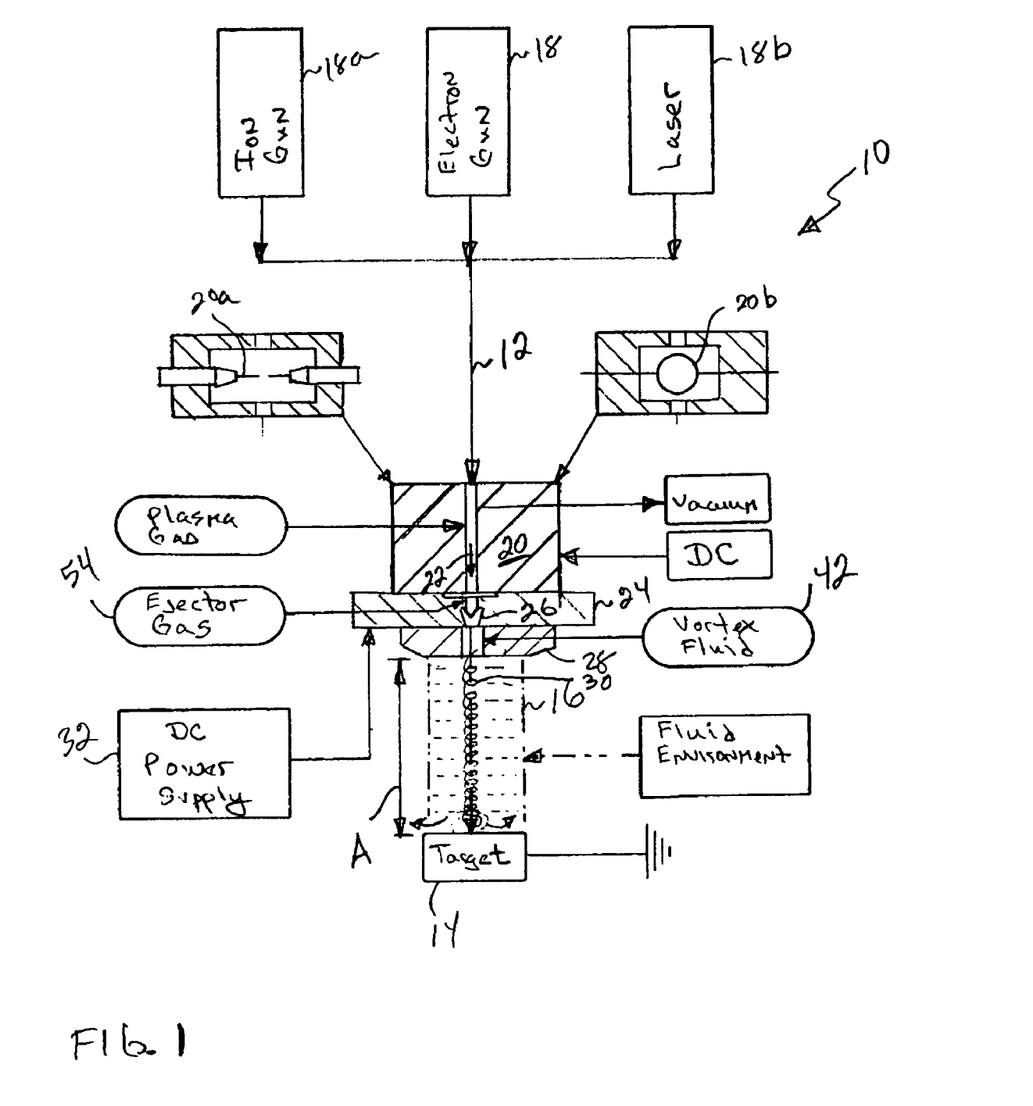
FIG. 1 is a schematic representation of an apparatus for shielding an energized beam delivered to a target through a fluid environment.

Illustrated schematically in FIG. 1 is an apparatus 10 for delivering a shielded energized beam 12 to a workpiece or target 14 through a local fluid environment 16, such as atmospheric air or alternatively underwater. The apparatus includes a conventional beam generator such as an electron gun 18, ion gun 18a, or laser 18b which are suitably configured for emitting corresponding energized beams 12 in the form an electron beam, ion beam, or laser beam, respectively.

The electron gun and ion gun are conventionally found in high vacuum chambers for efficiently producing the charged particle beams therefrom. The laser may be found in a suitable assembly under atmospheric conditions.

A plasma generator 20 is coaxially aligned with the beam generator 18 for producing a high temperature plasma 22 to shield the energized beam 12 concentrically therein. The plasma generator may have any conventional configuration, and may include a row of needle cathodes 20a or wire ring cathode 20b powered by a direct-current (DC) power supply for ionizing a suitable plasma gas such as helium, argon, or nitrogen under vacuum to produce the plasma 22 through which the energized beam 12 is transmitted along the straight beam path.

An electrode 24 in the form of a thin copper or molybdenum plate has a center transfer orifice or aperture 26 coaxially aligned with the outlet end of the plasma generator 20 in abutting contact therewith for receiving the beam 12 coaxially inside the surrounding plasma 22.

A vortex generator 28 is aligned coaxially with the electrode aperture 26 for producing a vortex in a fluid 30 concentrically around the plasma and beam. The energized beam 12 is shielded by the surrounding plasma and vortex which have axial momentum to bore through the fluid environment 16 over an axial range A to reach to the target 14.

Upon reaching the target, the energized beam is used for any conventional manufacturing process in which a charged particle beam such as an electron beam or ion beam, or a high energy laser beam may be used for altering the surface of the target in common practice. A typical example is the use of an electron beam or laser beam for cutting or welding the surface of the target.

Means in the form of a typical DC power supply 32 are provided for electrically biasing the electrode 24 and electrically grounding the target 14 relative thereto for driving the plasma 22 in an elongate column within its range A to reach the target 14. Electrically biasing the electrode 24 relative to the target correspondingly biases the shielding plasma 22 for driving it towards the target. And, biasing the plasma also magnetically focuses the charged particle beam being shielded in the plasma.

In this way, the plasma surrounds the energized beam and shields it from the fluid environment 16 which may be atmospheric air or even water in a pool for conducting underwater operations on the target 14 using the energized beam driven through the shielding plasma. The column of plasma 22 extends over the range A between the vortex generator and the target, and the vortex 30 developed around the plasma is used for stabilizing that plasma over the extended range A.

Accordingly, the energized beam may be conventionally formed in any suitable manner and transmitted through the plasma generator 20, with the plasma generated therein being discharged through the electrode 24 and vortex generator 28 for shielding the beam during its travel through the fluid environment and preventing or reducing degradation thereof.

As indicated above, electron beams and ion beams are readily degraded or attenuated in non-vacuum environments, but may be protected in the fluid environment 16 by the surrounding plasma shield. Similarly, the laser beam may also be protected during its travel through the fluid environment by the surrounding plasma shield.

Figure 2:
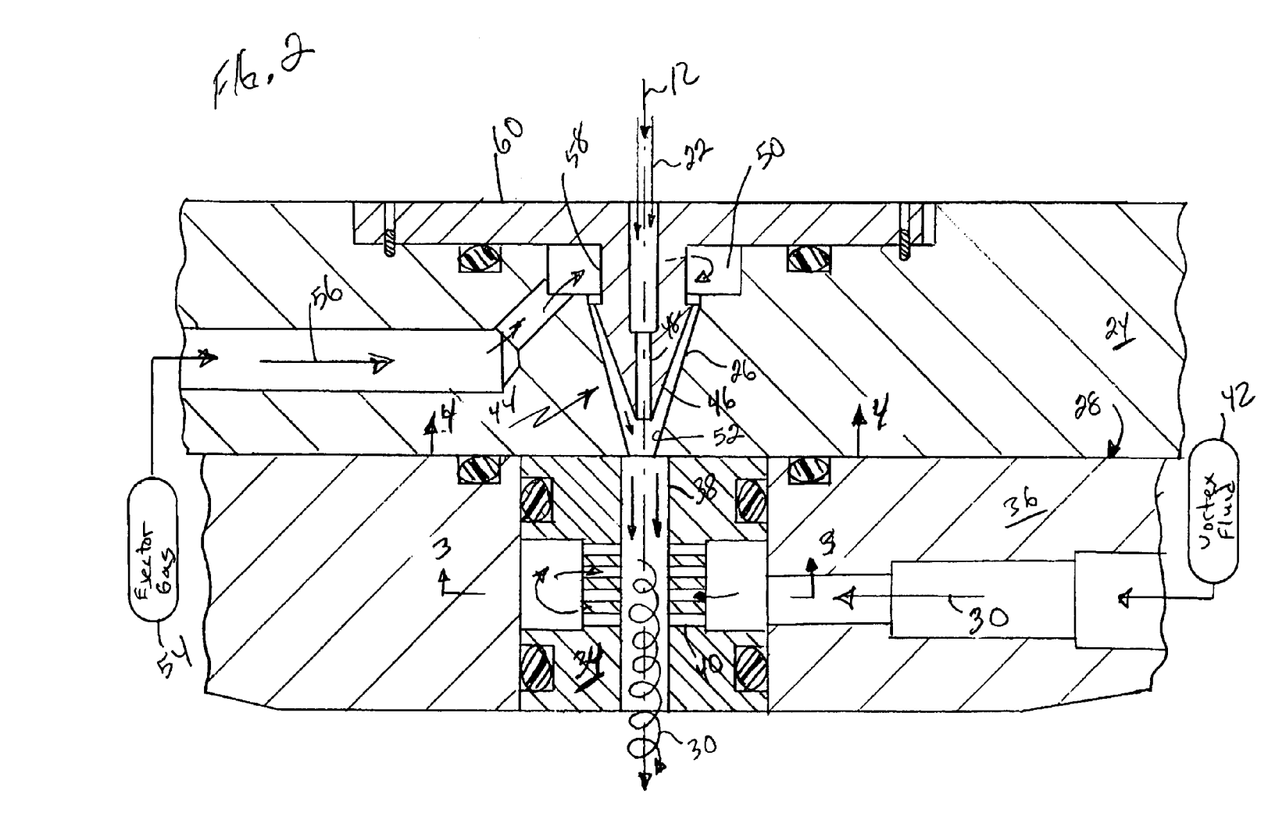
FIG. 2 is an enlarged sectional view of a portion a plasma ejector in an electrode late coaxially aligned with a vortex generator.
Figure 3:
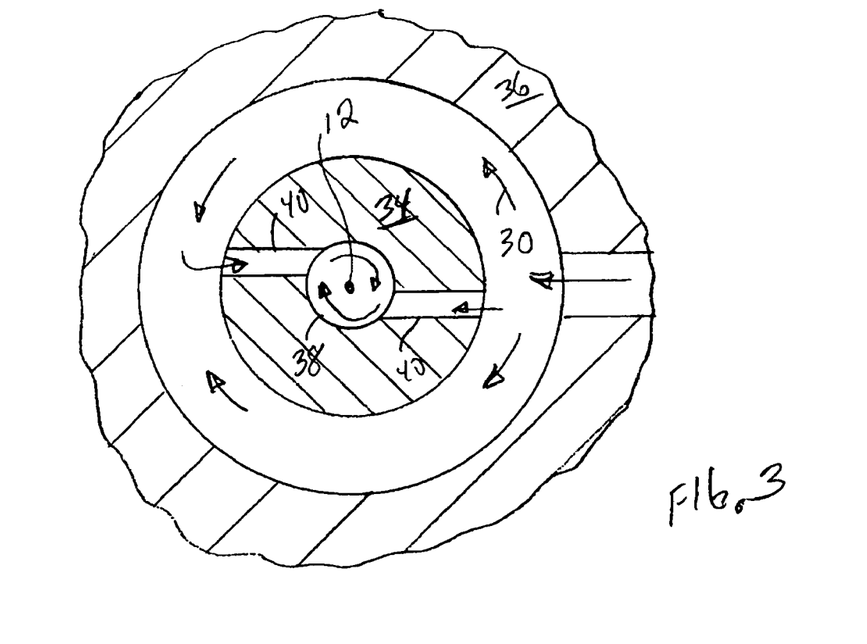
FIG. 3 is a transverse sectional view through the vortex generator illustrated in FIG. 2 and taken along line 3—3.

An exemplary embodiment of the vortex generator 28 is illustrated in more detail in FIGS. 2 and 3. The vortex generator includes a cylindrical body or tube 34 sealingly mounted in a corresponding bore in a supporting plate 36 by suitable O-ring seals. The supporting plate 36 may be suitably joined to the electrode plate 24 in abutting contact therewith with another O-ring seal surrounding the aligned aperture 26 and bore 38 for confining flow therethrough.

The tube includes a center channel or bore 38 coaxially aligned with the outlet end of the electrode aperture 26. The tube 34 further includes a plurality of tangential holes or ports 40 through the walls thereof offset from the centerline axis thereof and spaced circumferentially around the bore 38.

A fluid supply 42 is suitably joined in flow communication with the ports 40 for channeling the pressurized vortex fluid 30 into the bore 38 to form the fluid vortex around the plasma and center beam. The vortex fluid may be a suitable inert gas such as helium, argon, or nitrogen, or may be a suitable liquid such as water.

In the exemplary embodiment illustrated in FIGS. 2 and 3, the tangential ports 40 are cylindrical and arranged in rows along the span or axial axis of the tube 34. As shown in FIG. 2, the cylindrical ports 40 are normal or perpendicular with the tube span and parallel with the electrode plate 24. As shown in FIG. 3, the cylindrical ports 40 are radially offset from each other on opposite sides of the bore 38 and disposed generally tangential with the perimeter of the bore for injecting the vortex fluid in a clockwise direction inside the bore to develop the spinning vortex around the center beam and plasma.

The vortex generator illustrated in FIGS. 1 and 2 thusly introduces a spinning vortex around the plasma and energized beam being transmitted along the axial beam path through the center bore 38 which is then directed through the fluid environment toward the target.

The vortex tube 34 is formed of a suitable electrically conducting material such as copper and is electrically joined in abutting contact with the electrode plate 34 for electrically biasing the tube with the same bias as the electrode relative to the grounded target 14. Since the plasma which shields the energized beam is electrically conductive with magnetic properties, the voltage bias between the vortex generator and the grounded target promotes the axial travel of the plasma through the fluid environment for shielding the beam, while also magnetically focusing the plasma around the beam. The resulting columnar plasma is stabilized by the surrounding vortex generated by the vortex generator.

As initially illustrated in FIG. 2, the electrode 24 preferably includes a plasma eductor or ejector 44 disposed inside the center aperture 26 thereof for developing a partial vacuum to entrain the plasma 22 received from the plasma generator. The plasma is entrained or drawn from the plasma generator to impart axial momentum thereto in addition to the subsequent surrounding vortex 30 to reach the target through the fluid environment.

Figure 4:
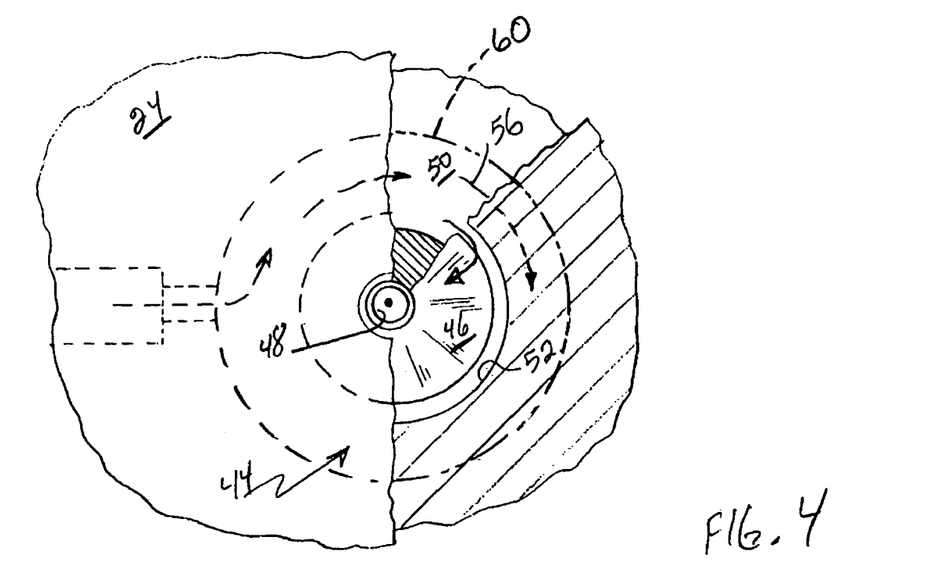
FIG. 4 is a partly sectional plan view of the outlet end of the plasma ejector illustrated in FIG. 2 and taken along line 4—4.

The plasma ejector 44 is illustrated in a preferred embodiment in FIGS. 2 and 4 and includes a conical tip or nozzle 46 which converges in the downstream direction toward the target. The nozzle includes a center bore 48 coaxially aligned with the plasma generator for receiving the energized beam and surrounding plasma 22.

Figure 5:
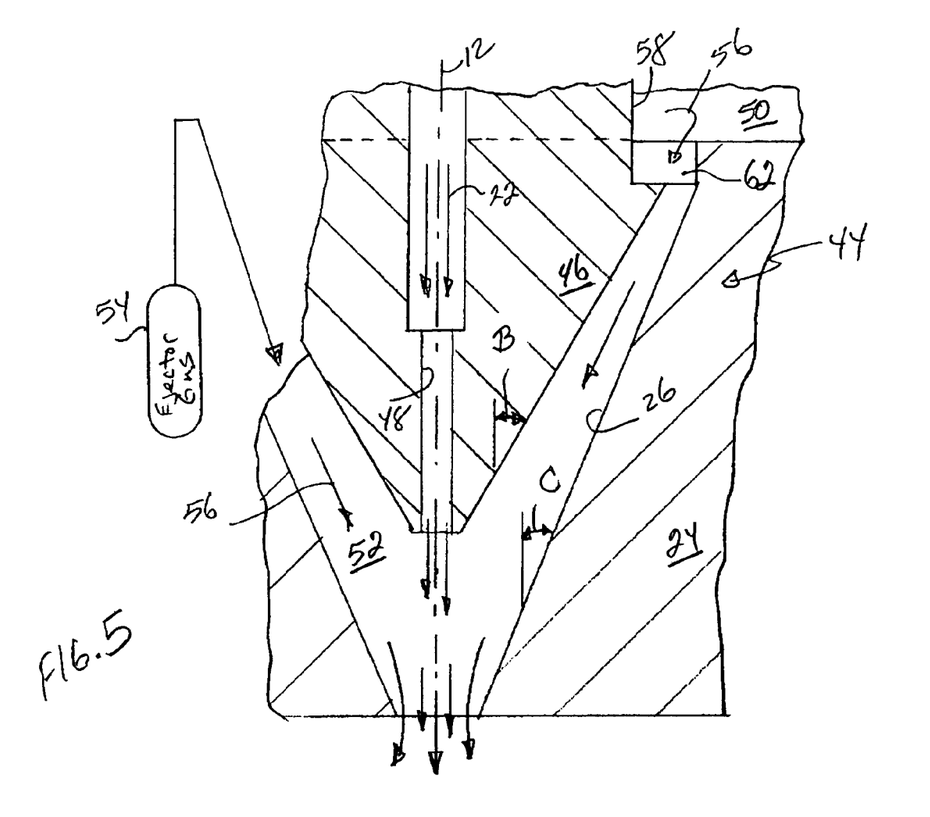
FIG. 5 is an enlarged sectional view through a portion of the plasma ejector illustrated in FIG. 2.

FIG. 5 illustrates in more detail preferred features of the plasma ejector 44. An annular or cylindrical inlet plenum 50 surrounds the upstream end of the nozzle 46 in a forward portion of the electrode aperture 26. A conical outlet channel or duct 52 surrounds the aft end of the nozzle in a conical aft portion of the electrode aperture and coaxially receives the conical nozzle therein.

A suitable gas supply 54 is joined in flow communication with the inlet plenum 50 for channeling a pressurized ejector gas 56 axially through the conical outlet plenum 52 to entrain the plasma 22 from the conical nozzle 46. The entraining or ejector gas 56 imparts axial momentum to the plasma 22 being drawn through the ejector nozzle 46.

The axial momentum of the plasma creates a column thereof reaching to the target which is stabilized by the surrounding vortex fluid 30. In this way the different ejector gas 56 and vortex fluid 30 are introduced for different functions which cooperate to shield the energized beam in its extended path through the fluid environment to reach the target.

The conical nozzle 46 illustrated in FIG. 5 has a half angle or cone angle B, and the conical aft portion of the electrode aperture 26 has a corresponding half angle or cone angle C, with both cones converging in the downstream direction to the outlet of the aperture 26. In the preferred embodiment, the nozzle cone angle is greater than the aperture cone angle for increasing the entraining capability of the ejector gas 56. In one embodiment, the nozzle angle B is 25 degrees and the aperture angle C is 18 degrees. In the preferred embodiment, the nozzle angle B is 30 degrees and the aperture angle C is 22 degrees for maximizing the entraining capability of the ejector gas.

As shown in FIG. 2, the conical nozzle 46 includes a cylindrical supporting stem 58 at its forward end disposed in the inlet plenum 50, with the stem being integrally joined to a supporting thin disk 60 mounted flush in a counterbore in the forward end of the electrode 24. Since the nozzle is axisymmetrical, a pair of alignment pins are introduced between the disk 60 and the counterbore seat in the electrode to ensure accurate coaxial alignment between the nozzle and the electrode aperture 26.

As shown in more detail in FIG. 5, the cylindrical stem 58 is recessed radially inwardly from the forward end of the conical nozzle 46 inside the electrode aperture to define a corresponding cylindrical step.

The electrode aperture 26 illustrated in FIG. 5 further includes a cylindrical counterbore 62 at the junction between the cylindrical inlet plenum 50 and the conical outlet duct 52 in which is disposed the nozzle step between the cylindrical stem 58 and the conical nozzle 46. This creates a local inlet in which the pressurized ejector gas 56 from the inlet plenum 50 is accelerated to the conical outlet duct 52. This inlet features further enhances the entraining capability of the ejector gas as it flows past the outlet end of the conical nozzle 46.

FIG. 5 further illustrates the preferred configuration of the distal or aft tip end of the conical nozzle 46 being recessed axially upstream from the distal or outlet end of the conical outlet duct 52. The walls of the conical nozzle 46 and conical aperture 26 diverge in the downstream direction relative to each other, but both converge to their corresponding aft ends. The upstream recess or step of the nozzle 46 inside the conical outlet duct 52 further improves the entraining capability of the ejector gas 56 as it flows past the outlet end of the center bore 48 in the nozzle tip.

In the preferred embodiment illustrated in FIG. 1, the vortex generator 28 cooperates with the plasma generator 20 for shielding the energized beam and promoting stability of the shielding plasma to the target over a suitable range. For example, the projection range A of the beam and shielding plasma in an atmospheric air environment may be about 25 mm for maintaining the efficacy of the energized beam.

The DC power supply 32 is electrically joined to the electrode 24 and vortex generator 28 for providing either a positive or negative electrical bias thereto relative to the electrically grounded target 14. The electrode bias may be used for promoting transport of the shielding plasma through the fluid environment.

For example, the beam generator in one embodiment comprises an electron beam gun 18 configured for emitting an electron beam 12 axially through the plasma generator 20, electrode 24, and vortex generator 28 toward the target 14. The power supply 32 is electrically joined to the electrode 24 to effect a negative electrical bias therein. The electron beam is directed toward the grounded target 14, and the negative bias of the electrode and vortex generator magnetically focuses the electron beam along its external path through the fluid environment.

Similarly, the beam generator may comprise an ion beam gun 18a configured for emitting a charged ion beam 12 through the plasma generator, electrode, and vortex generator toward the target. The power supply 32 effects a positive electrical bias in the electrode 24 and vortex generator which magnetically focuses the ion beam toward the target.

In yet another embodiment, the beam generator may comprise a laser 18b configured for emitting a high energy laser beam 12. The power supply 32 may be used to bias the electrode and vortex generator with either positive or negative electrical bias relative to the grounded target for again driving the plasma toward the target and shielding the laser beam therein.

As indicated above, the plasma generator 20 may have any conventional configuration and typically includes a center channel or bore coaxially aligned with the electrode aperture 26 for channeling the energized beam therethrough. The plasma generator includes suitable means for generating the plasma 22 in a vacuum inside the center bore in the plasma generator.

For example, a suitable vacuum pump is used to evacuate the housing of the plasma generator. A power supply energizes the cathodes to form the hot plasma. And a conventional plasma gas is suitably channeled through the center bore for generating the hot plasma under vacuum during operation.

The apparatus illustrated in FIG. 1 may be modified in numerous ways to shield the energized beam inside a vortex-stabilized plasma. The power supply 32 may be omitted in modifications where the electrode 24 and vortex generator 28 are relatively thin, and the external travel range A is relatively short.

Figure 6:
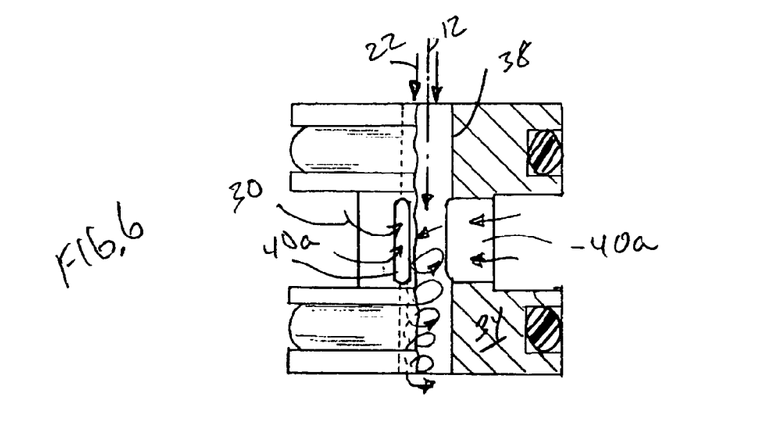
FIG. 6 is a partly sectional elevational view of the vortex generator illustrated in FIG. 2 in accordance with an alternate embodiment.

The tangential ports 40 in the vortex generator 28 illustrated in FIG. 2 are preferably cylindrical and arranged in a row. Alternatively, the tangential ports 40a may be axially elongated slots as illustrated in FIG. 6 extending along the span of the tube 34.

The cylindrical ports 40 or elongated slots 40a are generally normal to the span of the bore 38 without axial inclination, and are spaced apart around the circumference of the bore. Two or more rows of the ports may be provided around the perimeter of the tube 34 for tangentially injecting the vortex fluid 30 to spiral around the plasma being channeled axially through the center bore 38 during operation.

Figure 7:
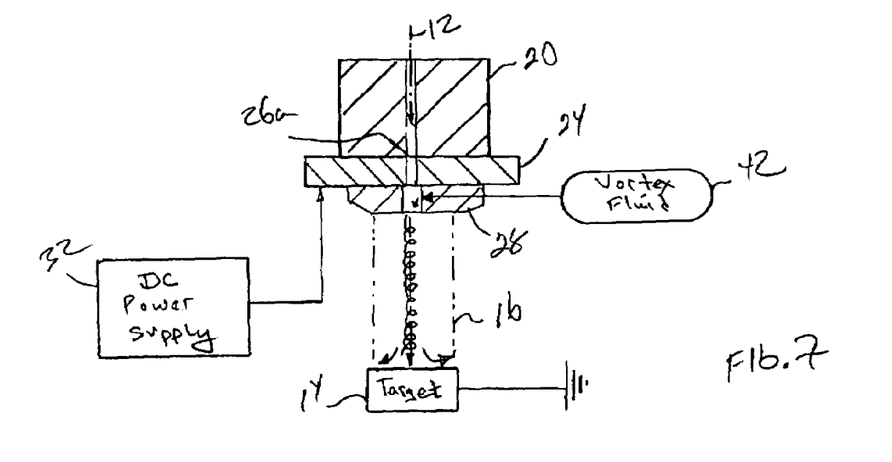
FIG. 7 is a schematic view, like FIG. 1, of a modification thereof for an alternate embodiment excluding the plasma ejector.

FIG. 7 illustrates a modification of the basic embodiment illustrated in FIG. 1 in which the electrode 24 includes a plain cylindrical aperture 26a without the plasma injector provided therein. Axial momentum is introduced in the shielding plasma not by the omitted plasma injector, but instead by a further modification of the vortex generator as illustrated in more detail in FIG. 8.

Figure 8:
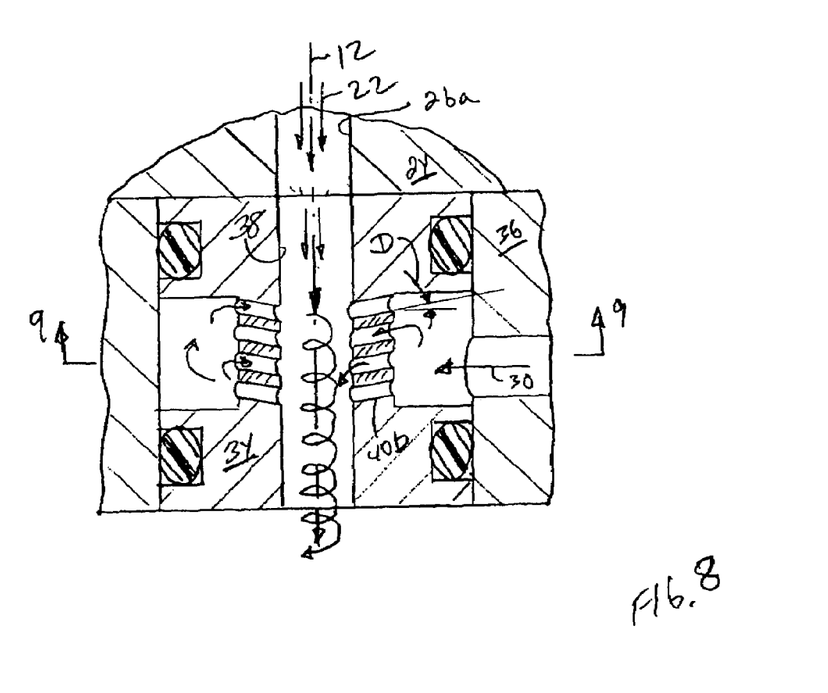
FIG. 8 is an enlarged sectional view of the vortex generator illustrated in FIG. 7 in accordance with an exemplary embodiment.

The tangential ports 40b are additionally inclined with an axial inclination angle D axially aft along the center bore 38. In this way, the inlet and outlet ends of the inclined tangential ports 40b are offset axially along the span of the center bore 38, with the port outlets being disposed closer to the outlet end of the center bore 38 than the port inlets. The vortex fluid 30 is then driven under pressure through the inclined ports 40b to create the vortex around the plasma 22, as well as imparting axial momentum to the plasma toward the downstream target illustrated in FIG. 7.

Figure 9:
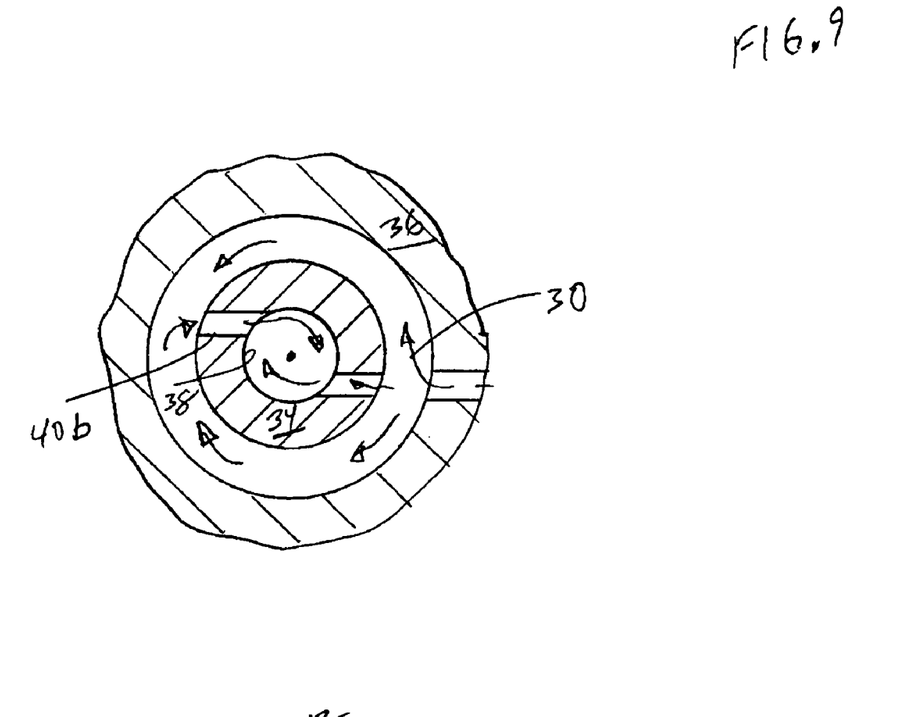
FIG. 9 is a transverse sectional view through the vortex generator illustrated in FIG. 8 and taken along line 9—9.
Figure 10:
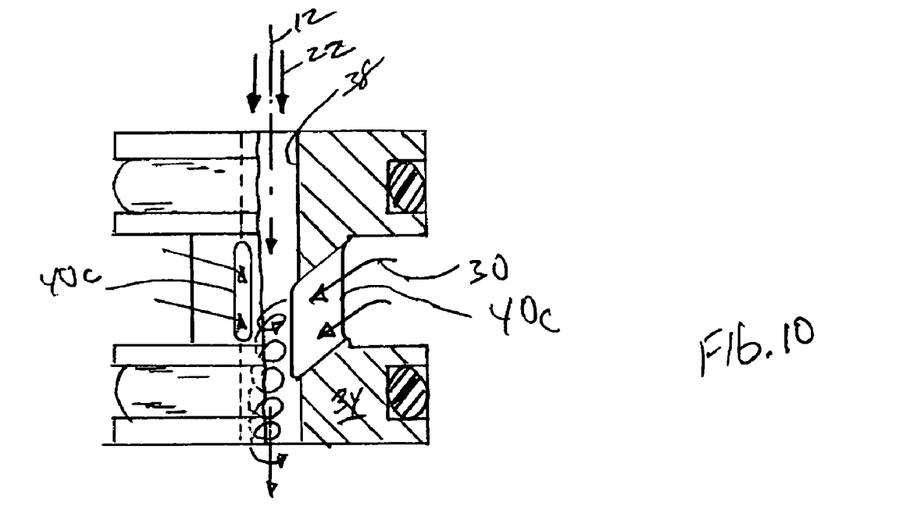
FIG. 10 is a partly sectional elevational view of the vortex generator illustrated in FIG. 7 in accordance with an alternate embodiment.

The tangential ports 40a illustrated in FIGS. 8 and 9 are cylindrical as in the previous embodiment, and similarly arranged in rows along the span of the tube 34. FIG. 10 illustrates an alternate embodiment of the tube 34 in which the tangential ports comprise axially elongated slots 40c extending along the span of the tube. The inclined tangential slots impart both circumferential and axial motion to the vortex fluid 30 as it surrounds the plasma 22 and energized beam being shielded thereby.

The apparatus disclosed above in various embodiments permits various manufacturing methods or processes using electron, ion, and laser beams to be performed in practically any external environment such as atmospheric air and water. For example, electron beam and laser welding may be performed underwater, with the plasma shield protecting the energized beam in its travel through the water until it reaches the underwater target.

The apparatus and its method of use also allow for in situ repair of ship and nuclear reactor components as well as in-air ion implantation of semiconductors. The advantages of laser, electron, and ion beam techniques may now be viable in a broad range of applications not contemplated by existing beam processes in the manufacturing field.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An apparatus comprising:
   a beam generator for emitting an energized beam;
   a plasma generator aligned with said beam generator for producing a plasma to shield said beam;
   an electrode having an aperture coaxially aligned with said plasma generator for receiving said beam inside said plasma;
   a vortex generator coaxially aligned with said electrode aperture for producing a fluid vortex concentrically around said plasma and beam;
   a target spaced from said vortex generator inside a fluid environment; and
   means for electrically biasing said electrode and electrically grounding said target relative thereto for driving said plasma toward said target.

2. An apparatus according to claim 1 wherein said vortex generator includes:
   a tube having a center bore coaxially aligned with said electrode aperture;
   a plurality of tangential ports offset through said tube around said bore; and
   a fluid supply joined to said ports for channeling a pressurized vortex fluid into said bore to form said fluid vortex around said plasma and beam.

3. An apparatus according to claim 2 wherein said tube is electrically joined to said electrode for electrically biasing said tube relative to said target.

4. An apparatus according to claim 3 wherein said electrode further includes a plasma ejector disposed in said aperture for developing a vacuum to entrain said plasma from said plasma generator.

5. An apparatus according to claim 4 wherein said plasma ejector comprises:
   a conical nozzle having a center bore aligned with said plasma generator;
   an annular inlet plenum surrounding said nozzle at a forward portion of said electrode aperture;
   a conical outlet duct in a conical aft portion of said electrode aperture coaxially receiving said conical nozzle therein; and
   a gas supply joined to said inlet plenum for channeling a pressurized ejector gas through said conical outlet duct to entrain said plasma from said nozzle.

6. An apparatus according to claim 5 wherein said conical nozzle has a larger cone angle than said conical aft portion of said aperture.

7. An apparatus according to claim 5 wherein:
   said conical nozzle includes a cylindrical stem in said inlet plenum recessed radially inwardly from said electrode aperture to define a step; and
   said electrode aperture further includes a cylindrical counterbore at the junction between said inlet plenum and said outlet duct, and said nozzle step is disposed inside said counterbore.

8. An apparatus according to claim 7 wherein said conical nozzle includes a distal tip recessed axially upstream from the outlet end of said conical outlet duct.

9. An apparatus according to claim 5 wherein said tangential ports in said vortex generator are arranged in rows along the span of said tube.

10. An apparatus according to claim 9 wherein said ports are cylindrical and normal with said tube span.

11. An apparatus according to claim 5 wherein said tangential ports in said vortex generator comprise elongated slots extending along the span of said tube.

12. An apparatus according to claim 3 wherein said biasing means comprise a DC power supply electrically joined to said electrode and vortex generator for providing a positive or negative electrical bias thereto.

13. An apparatus according to claim 12 wherein:
    said beam generator comprises an electron beam gun configured for emitting an electron beam through said plasma generator, electrode, and vortex generator toward said target; and
    said power supply is electrically joined to said electrode to effect a negative bias therein.

14. An apparatus according to claim 12 wherein:
    said beam generator comprises an ion beam gun configured for emitting an ion beam through said plasma generator, electrode, and vortex generator toward said target; and
    said power supply is electrically joined to said electrode to effect a positive bias therein.

15. An apparatus according to claim 12 wherein said beam generator comprises a laser configured for emitting a laser beam through said plasma generator, electrode, and vortex generator toward said target.

16. An apparatus according to claim 3 wherein said plasma generator includes a center bore coaxially aligned with said electrode aperture, and means for generating said plasma in a vacuum inside said center bore through said plasma generator.

17. An apparatus according to claim 3 wherein said fluid environment comprises atmospheric air.

18. An apparatus according to claim 3 wherein said fluid environment comprises water.

19. An apparatus according to claim 3 wherein said tangential ports are additionally inclined axially aft along said center bore, with axially offset inlets and outlets.

20. An apparatus according to claim 19 wherein said tangential ports are cylindrical, and arranged in rows along the span of said tube.

21. An apparatus according to claim 19 wherein said tangential ports comprise elongated slots extending along the span of said tube.

22. An apparatus according to claim 19 wherein said electrode aperture is cylindrical for channeling said plasma from said plasma generator into said vortex generator, and said tangential ports are inclined for both forming said fluid vortex around said plasma and imparting axial momentum to said plasma to reach said target.

23. An apparatus comprising:
    a beam generator for emitting an energized beam;
    a plasma generator aligned with said beam generator for producing a plasma to shield said beam;
    an electrode having an aperture coaxially aligned with said plasma generator for receiving said beam inside said plasma;
    a plasma ejector disposed in said electrode aperture for developing a vacuum to entrain said plasma from said plasma generator;
    a vortex generator coaxially aligned with said electrode aperture for producing a fluid vortex concentrically around said plasma and beam;
    a target spaced from said vortex generator inside a fluid environment; and
    means for electrically biasing said electrode and electrically grounding said target relative thereto for driving said plasma toward said target.

24. An apparatus according to claim 23 wherein said plasma ejector comprises:
- a conical nozzle having a center bore aligned with said plasma generator;
- an annular inlet plenum surrounding said nozzle at a forward portion of said electrode aperture;
- a conical outlet duct in a conical aft portion of said electrode aperture coaxially receiving said conical nozzle therein; and
- a gas supply joined to said inlet plenum for channeling a pressurized ejector gas through said conical outlet duct to entrain said plasma from said nozzle.

25. An apparatus according to claim 24 wherein said vortex generator includes:
- a tube having a center bore coaxially aligned with said electrode aperture;
- a plurality of tangential ports offset through said tube around said bore; and
- a fluid supply joined to said ports for channeling a pressurized vortex fluid into said bore to form said fluid vortex around said plasma and beam.

26. An apparatus according to claim 25 wherein:
- said conical nozzle includes a cylindrical stem in said inlet plenum recessed radially inwardly from said electrode aperture to define a step; and
- said electrode aperture further includes a cylindrical counterbore at the junction between said inlet plenum and said outlet duct, and said nozzle step is disposed inside said counterbore.

27. An apparatus according to claim 26 wherein said conical nozzle includes a distal tip recessed axially upstream from the outlet end of said conical outlet duct.

28. An apparatus according to claim 27 wherein said conical nozzle has a larger cone angle than said conical aft portion of said aperture.

29. An apparatus according to claim 28 wherein said tangential ports are cylindrical and arranged in rows normal with the span of said tube.

30. An apparatus according to claim 29 wherein said biasing means comprise a DC power supply electrically joined to said electrode and vortex generator for providing a positive or negative electrical bias thereto.

31. A method of shielding an energized beam through a fluid environment to a target comprising:
- generating a plasma around said beam;
- generating a vortex concentrically around said plasma and beam; and
- electrically grounding said target relative to said plasma to drive said plasma toward said target.

32. A method according to claim 31 further comprising entraining said plasma to impart axial momentum thereto in addition to said vortex therearound to reach said target through said fluid environment.

33. A method according to claim 32 wherein said plasma is entrained in a surrounding gas, and said vortex is effected by a different fluid.

* * * * *